(12) United States Patent
Yu

(10) Patent No.: US 9,473,487 B2
(45) Date of Patent: Oct. 18, 2016

(54) NETWORK IDENTITY CERTIFICATE PINNING

(71) Applicant: Bank of America Corporation, Charlotte, NC (US)

(72) Inventor: Sounil Yu, Reston, VA (US)

(73) Assignee: Bank of America Corporation, Charlotte, NC (US)

(*) Notice: Subject to any disclaimer, the term of this patent is extended or adjusted under 35 U.S.C. 154(b) by 109 days.

(21) Appl. No.: 14/460,401

(22) Filed: Aug. 15, 2014

(65) Prior Publication Data

US 2016/0050200 A1  Feb. 18, 2016

(51) Int. Cl.
   *H04L 29/06* (2006.01)

(52) U.S. Cl.
   CPC .................. *H04L 63/0823* (2013.01)

(58) Field of Classification Search
   CPC ............. H04L 63/0823; H04L 9/3263; H04L 9/3247; H04L 63/062; H04L 63/08; H04L 63/14; H04L 9/321
   See application file for complete search history.

(56) References Cited

U.S. PATENT DOCUMENTS

| 2005/0148299 | A1* | 7/2005 | Buckley ............... H04W 48/18 455/41.2 |
| 2005/0174945 | A1* | 8/2005 | Carrion-Rodrigo .... H04L 29/06 370/241 |
| 2007/0073868 | A1* | 3/2007 | Nelson ............... H04L 63/0823 709/224 |
| 2008/0082830 | A1* | 4/2008 | Goulet ............... H04L 63/0823 713/177 |
| 2010/0106966 | A1* | 4/2010 | Santos .................... H04L 12/66 713/156 |
| 2014/0310777 | A1* | 10/2014 | Truskovsky ........ H04L 63/0823 726/4 |
| 2014/0325208 | A1* | 10/2014 | Resch ..................... H04L 9/085 713/156 |
| 2014/0325623 | A1* | 10/2014 | Johansson ........... H04L 63/0823 726/6 |
| 2015/0133116 | A1* | 5/2015 | Lauer ..................... H04W 4/14 455/435.1 |
| 2015/0264040 | A1* | 9/2015 | Schneider ............. H04L 9/3265 726/10 |

\* cited by examiner

*Primary Examiner* — Catherine Thiaw
(74) *Attorney, Agent, or Firm* — Banner & Witcoff, Ltd.; Michael A. Springs

(57) ABSTRACT

Systems, methods and apparatuses for ensuring that a computing device is attempting to connect to a network, such as a wireless network, provided by an expected or trusted entity. For instance, a certificate may be generated for a network and/or associated with the network. The certificate may then be transmitted to one or more computing devices that may be authorized to access the network. Accordingly, when the computing device selects the network for connection, the system may determine whether the certificate associated with the network is paired with the certificate provided on the computing device. If so, the computing device may be permitted to transmit data over the network. Alternatively, if the network certificate is not paired with the certificate provided on the computing device, the computing device may be prevented from transmitting data over the network.

17 Claims, 7 Drawing Sheets

NETWORK IDENTITY CERTIFICATE PINNING

BACKGROUND

Protecting people's privacy, personal information, financial information, and the like, is a significant challenge in today's digital world. Users are often connecting various devices, such as mobile devices, to various wireless networks at locations ranging from a local coffee shop to the user's place of business. However, connecting to these networks may be dangerous when you are unable to confirm that you are connecting to a network legitimately provided by an expected entity (e.g., the entity in the name of the network, the coffee house, your place of business, or the like). Individuals may create networks having names the same as or similar to networks associated with an expected or trusted entity to attempt to lure users into connecting to the network so that they can, in some examples, attempt to access personal information, financial information, username and password information, and the like, without the permission of the user. This can pose a serious threat to a user's privacy and information security.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for ensuring that a computing device is connecting to a network provided by an expected or trusted entity. For instance, a certificate may be generated for a network. In some examples, the certificate may be unique to the network. The certificate may then be transmitted or provided to one or more computing devices that may be authorized to access the network. Accordingly, when the computing device selects the network for connection, the system may determine whether the certificate associated with the network matches or is paired with the certificate provided to or preinstalled on the computing device. If so, the computing device may be permitted to attempt to connect to or transmit data over the network (e.g., additional authentication may be requested or required prior to a connection being made). Alternatively, if the network certificate does not match or is not paired with the certificate provided to the computing device, the computing device may be prevented from attempting to access or connect to the network (e.g., that network may no longer be accessible from the computing device, may appear grayed-out, or the like).

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
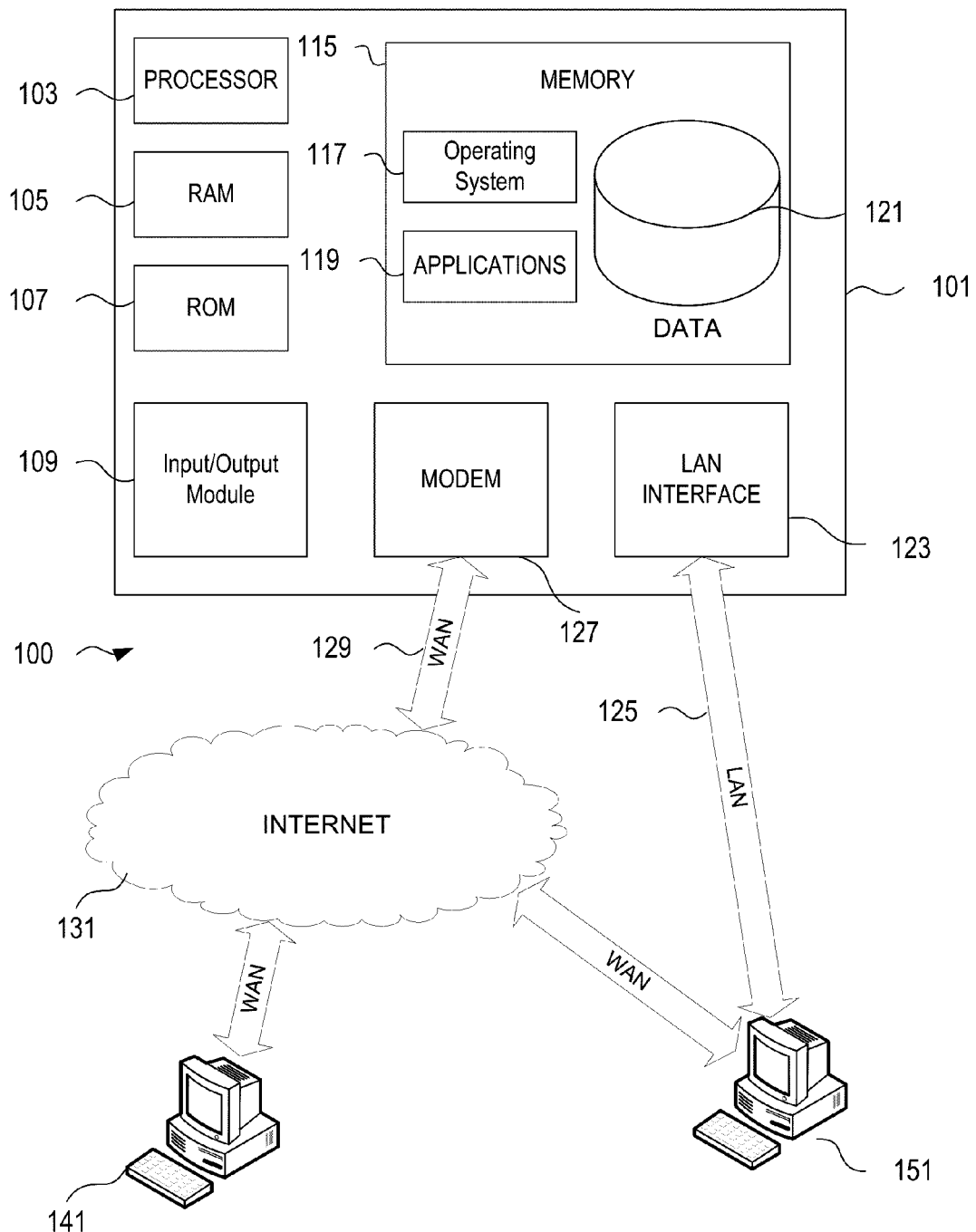
FIG. 1 illustrates an example operating environment in which various aspects of the disclosure may be implemented.

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

As discussed above, in today's digital world, people are often connecting their computing devices to networks, such as wireless networks, at various locations. Often, selection of a network to which the user will attempt to connect his or her device is based on the name associated with that network. Accordingly, businesses or other entities may use a network naming convention that includes the name of the business or entity in the name of the network, in order to simplify identifying the network to which a user will or should attempt to connect. For instance, Company A's network may be named "NETWORKCOMPANYA," or simply "COMPANY A" so that users looking to connect a device to the network can quickly and/or easily identify the desired network.

However, malicious individuals may create networks that are not legitimately associated with the company or entity but may use the company or entity name in the name of the network. This may be done in an effort to lure or mislead users into thinking the network is associated with the company or entity so that they will connect to the network. At that point, the individuals establishing the illegitimate networks may attempt to obtain the user's personal information, financial information, or the like, without the permission of the user. Accordingly, it would be advantageous to have a system and method of ensuring that the network being selected, or to which a user will attempt to connect, is actually associated with the expected company or entity or a trusted entity or company. That is, that the network is, in fact, associated with the company or entity for which the network is named. It would further be advantageous to have a level of assurance that the network is provided by the expected or trusted entity prior to transmitting data over the network.

Accordingly, as will be discussed more fully below, a certificate may be generated and associated with a network. In some examples, the certificate may be unique to the network. The certificate may then be transmitted or provided to computing devices authorized to access the network and may be associated with the computing devices. When a user selects a network to which he or she will attempt to connect, the system may determine whether the certificate associated with the selected network is paired with the certificate preinstalled or provided on the computing device. If so, the computing device may permit the user to access or connect to the network. If not, the computing device may be prevented from attempting to access or connect to the network. These and various other aspects of the disclosure will be discussed more fully below.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
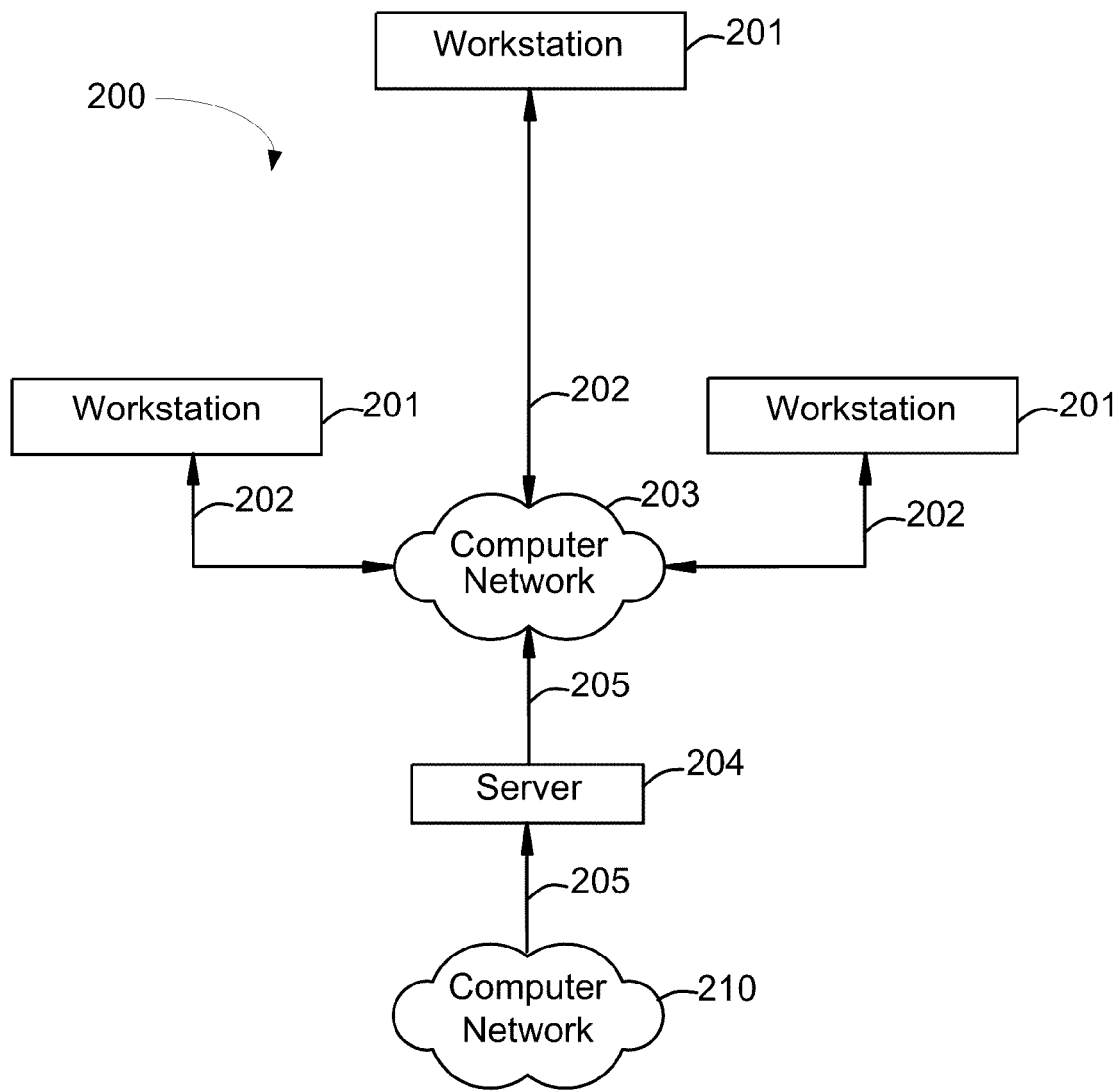
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
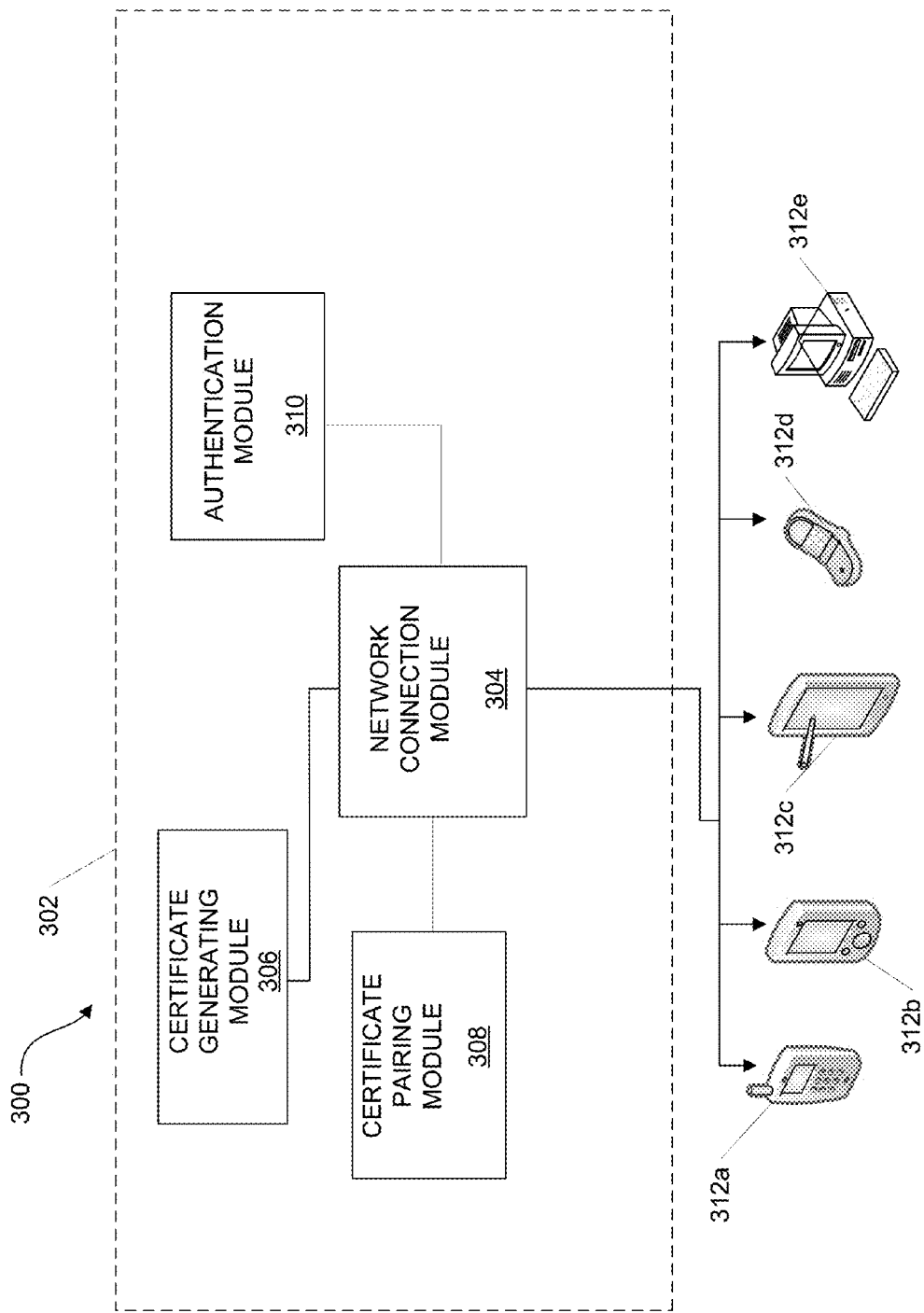
FIG. 3 illustrates an example network identity certificate pinning system according to one or more aspects described herein.

FIG. 3 illustrates one example network identity certificate pinning system 300 according to one or more aspects described herein. In some examples, the network access certificate pinning system 300 may be part of, internal to or associated with an entity 302. The entity 302 may be a corporation, university, government entity, and the like. In some examples, the entity 302 may be a financial institution, such as a bank. Although various aspects of the disclosure may be described in the context of a financial institution, nothing in the disclosure shall be construed as limiting the network identity certificate pinning system 300 to use within a financial institution. Rather, the system 300 may be implemented by various other types of entities.

The network identity certificate pinning system 300 may include one or more modules that may include hardware and/or software configured to perform various functions within the system 300. The one or more modules may be separate, physical devices or, in other examples, one or more modules may be part of the same physical device.

The system 300 may include a network connection module 304. The network connection module 304 may receive a request to attempt to access one or more networks, such as from one or more computing devices 312a-312e. For instance, a request to attempt to access a network may be received from a smart phone 312a, a personal digital assistant (PDA) 312b, a tablet computing device 312c, a cell phone 312d, or another type of computing device 312e.

In some examples, the request to attempt access one or more networks may include a request to attempt to access, via a wireless connection, a network that appears available for connection as displayed by the computing device 312. For instance, the computing device 312 may display (either automatically or upon user input requesting such information) a list of networks available for connection. The networks may be labelled by a unique name or may include a generic name. In many arrangements, a network may be named by a network or other administrator. Accordingly, an administrator may name the network as desired. In situations in which a network is being set up to appear to be a network associated with an entity when, in fact, the network is not legitimately associated with that entity, the name of the network can mislead a user into believing that they are connecting to a legitimate network of the entity when, in fact, they are not.

Accordingly, one or more networks may be associated with a certificate generated by, for instance, a certificate generation module 306. The certificate generation module 306 may generate, for one or more networks as desired, a certificate (or pair of certificates as will be discussed below) certifying that the network is a trusted network (e.g., that the identified network is legitimately associated with the entity indicated or expected based on a name or other identifier associated with the network). The certificate may be associated with that particular network, such that it is, in at least some arrangements, unique to that network.

The generated certificate may include a pair of certificates. For instance, a private certificate may be associated with or pinned to the network and may be placed on each of the network access points. A corresponding, public certificate may be paired with the private certificate and provided to or preinstalled on one or more computing devices. Accordingly, when a computing device attempts to connect to the network (e.g., via the network access point) the authenticity of the network may be verified via a mathematical pairing of the public certificate provided to or preinstalled on the computing device and the private certificate of the network being accessed.

The generated certificate may be transmitted to, provided to, or preinstalled on one or more computing devices (such as devices 312a-312e) in order to facilitate the secure or trusted network access process described herein. For instance, the public certificate paired with the private certificate generated for the network may be provided to or preinstalled on one or more devices that are associated with that network, such as computing devices of one or more employees or others who are authorized to access the network. In some examples, the public certificate may be received by the computing device 312 and may be stored on the device (e.g., locally stored on the device). In some arrangements, a computing device 312 may store a plurality of different public certificates paired with a plurality of private certificates associated with a plurality of different networks to which the device may connect or attempt to connect.

The network identity certificate pinning system 300 may further include a certificate pairing module 308. The certificate pairing module 308 may, upon a computing device attempting to access to a network, determine whether a public certificate provided on or preinstalled on that device matches or is paired with the private certificate for the particular network being accessed. If so, the certificate pairing module 308 may permit (or may transmit instructions to, for instance, the network connection module 304, to permit) the computing device 312 to access the network and/or transmit data over the network.

Permitting the access to the network or the transmission of data over the network may include an additional step of requesting login credentials or other forms of authentication of a user of the computing device and/or authenticating the user of the computing device prior to providing access and/or connecting to the network. Requesting authenticating information may be performed separately or subsequent to determining whether the certificates of the computing device and network are paired. For instance, the certificate pairing module 308 may transmit instructions to an authentication module 310 indicating that the certificates are paired. The authentication module 310 may then generate a request for authentication and transmit it to the computing device. The computing device 312 may display the request for a username and/or password, biometric data, or other authenticating information of a user of the computing device 312. Thus, in some examples, the mere fact that a computing device has a public certificate matching or paired to a private certificate associated with a particular network is not sufficient to transmit data over to the network. Rather, additional authentication may be requested or required prior to providing access (e.g., transmitting data over) the network.

Similar to conventional systems, if authentication information received via the computing device 312 matches authentication information associated with a user and stored on the system (e.g., stored in a database associated with the authentication module 310), the device and/or user may be authenticated to the system and a connection may be made between the computing device 312 and the network.

If the certificate pairing module 308 does not detect a pairing between the certificate provided on or preinstalled on the requesting device and the certificate associated with the identified network, the certificate pairing module 308 may prevent (or transmit instructions to, for instance, the network connection module 304 to prevent) access to, attempts to access, or transmission of data over the network. Preventing attempts to access to the network or transmission of data over the network may include causing a notification to be displayed on the requesting computing device indicating that the certificates are not paired and indicating that access to that network will not be permitted (e.g., no data may be transmitted over that network, no request for credentials or other authentication may be transmitted to the computing device, or the like). In another example, preventing attempts to access the network may include removing the network from a list of available networks, causing the network to appear grayed-out or otherwise unavailable in a list of available networks, or the like. In some examples, networks to which access is being prevented (e.g., due to a determination that the certificate of the computing device is not paired with the certificate of the network) may include a visual cue along with the name of the network, for instance, in a list of networks. The visual cue may include a red "X" or other indication that this network is not accessible. Various other examples of visual cues will be discussed more fully below.

These and various other arrangements will be discussed more fully below.

Figure 4:
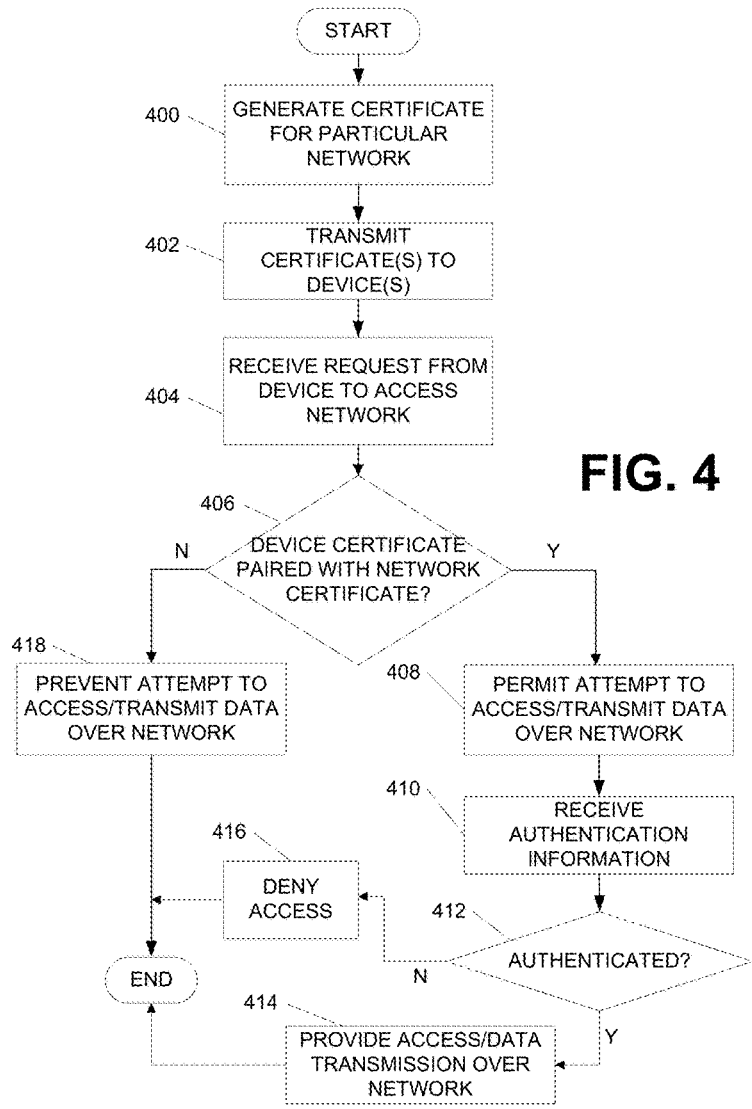
FIG. 4 is an example method of generating a network identity certificate and using the generated certificate to ensure that computing devices are attempting to connect to a network associated with an expected or trusted entity according to one or more aspects described herein.

FIG. 4 illustrates one method of generating a network identity certificate and using the generated certificate to permit attempts to access a network, according to one or more aspects described herein. In step 400, a certificate for a network is generated. For instance, a certificate generating module (306 in FIG. 3) may generate a certificate for one or more networks. The certificate may aid in providing secure access to the networks by indicating to users attempting to connect to the networks that the networks are associated with a trusted or expected entity. For instance, a certificate may be generated for and/or issued to a network to indicate that the network is associated with an entity to which it may seem to be associated or to which a user would expect it to be associated (e.g., an entity having a name corresponding to the name of the network). Accordingly, if a user is attempting to connect to NetworkCompany1, the certificate matching process described herein may provide an indication that NetworkCompany1 is legitimately associated with Company 1 and is not a network associated with an individual or entity attempting to facilitate unlawful or unauthorized activity.

In step 402, one or more certificates associated with one or more networks may be transmitted to, provided to, or preinstalled on one or more computing devices. As discussed above, the certificate provided to the computing device may be a public certificate paired with the private certificate associated with the network. In such examples, generation of the certificate includes generation of the pair of certificates. A certificate generated for a particular network of an entity may be transmitted, uploaded, or the like, to a computing device associated with the entity. In some examples, network NetworkCompany1 may be a network associated with Company 1. Accordingly, a certificate may be generated for that network and that certificate (or a public certificate paired with the private certificate associated with the network) may be placed on one or more computing devices associated with Company 1. For instance, the certificate may be placed on laptops, tablets, smart phones, desktop computers, and the like, of employees of Company 1, such that when the employee attempts to access NetworkCompany1 from a device, the certificate pairing process may occur to ensure that the network is legitimately associated with Company 1, as discussed more fully herein.

In step 404, a request may be received to attempt to connect to a network (e.g., a network having a certificate indicating it is associated with the trusted or expected entity). An attempt to connect to a network may include selecting from a listing of available networks (e.g., available wireless networks) a desired network to which the device will attempt to connect. The listing of available networks may be displayed on the computing device automatically or upon receiving user input requesting display of the listing of available networks. In some examples, display of the available networks may include a visual cue or other indication that the network is a trusted network (e.g., based on a determination that the certificates of the device and network are paired).

In step 406, a determination may be made as to whether a certificate provided on or preinstalled on the computing device attempting to connect to the identified or selected network matches the certificate of the identified or selected network. In some examples, the determination of whether the certificates are paired may be performed upon selection of a network (e.g., upon initiation of an attempt to access a network or selection of the network from the list of available networks). That is, in some examples, a connection to the network may be made but prior to transmission of any data over the network, the determination of whether the certificates are paired may be made. Thus, the determination of whether the certificates are paired may be performed prior to transmitting data over the network which may prevent malicious individuals from obtaining data without a user's permission.

If, in step 406, the certificates are paired, the attempt to access the network by the computing device may be permitted in step 408. As indicated above, in some examples, permitting the computing device to attempt to access the network might include providing access to the network including permitting transmission of data over the network. Permitting the attempt to access the network may further include any requests for identification, authentication, or the like, which may be necessary or desired to complete a connection between the computing device and the network.

For instance, in step 410, after the connection to the network has been made (e.g., a determination has been made that the certificates are paired and data transmission over the network is permitted) authentication information may be received from the computing device and/or a user associated with the computing device. Thus, receiving authentication information may be separate from or subsequent to the determination of whether the certificates are paired. Authentication information may include username, password, biometric data, and the like. A determination may be made, in step 412, as to whether the user is authenticated (e.g., whether received authentication information matches pre-stored authentication information). If so, access to the network may be permitted in step 412. Access to the network may include permitting or facilitating the transmission of data between the computing device and the network.

If, in step 412, the user is not authenticated, then access to the network may be denied in step 416. Access being denied may include providing an indication to the user that the user's credentials or other authentication information was not valid or did not meet predefined requirements for authentication.

If, in step 406, a determination is made that the certificate provided on or preinstalled on the computing device does not match the certificate associated with the identified or selected network to which the user or device is attempting to connect, an attempt to access (e.g., transmit data over) the network may be prevented in step 418. As indicated above, preventing an attempt to access the network may include providing an indication (e.g., an interface for display on the computing device) that this network might not be legitimate or legitimately associated with the expected entity and, accordingly, the computing device will not be permitted to attempt to access the network (e.g., no authentication information will be requested, no transmission of data over the network, or the like). Rather, the network may, in some examples, essentially be or appear unavailable to the user/computing device based on the determination that the certificates do not match. In some examples, the network name may be associated with a visual cue indicated that the certificates are not paired and, thus, the network is not or might not be associated with a trusted entity.

Figure 5:
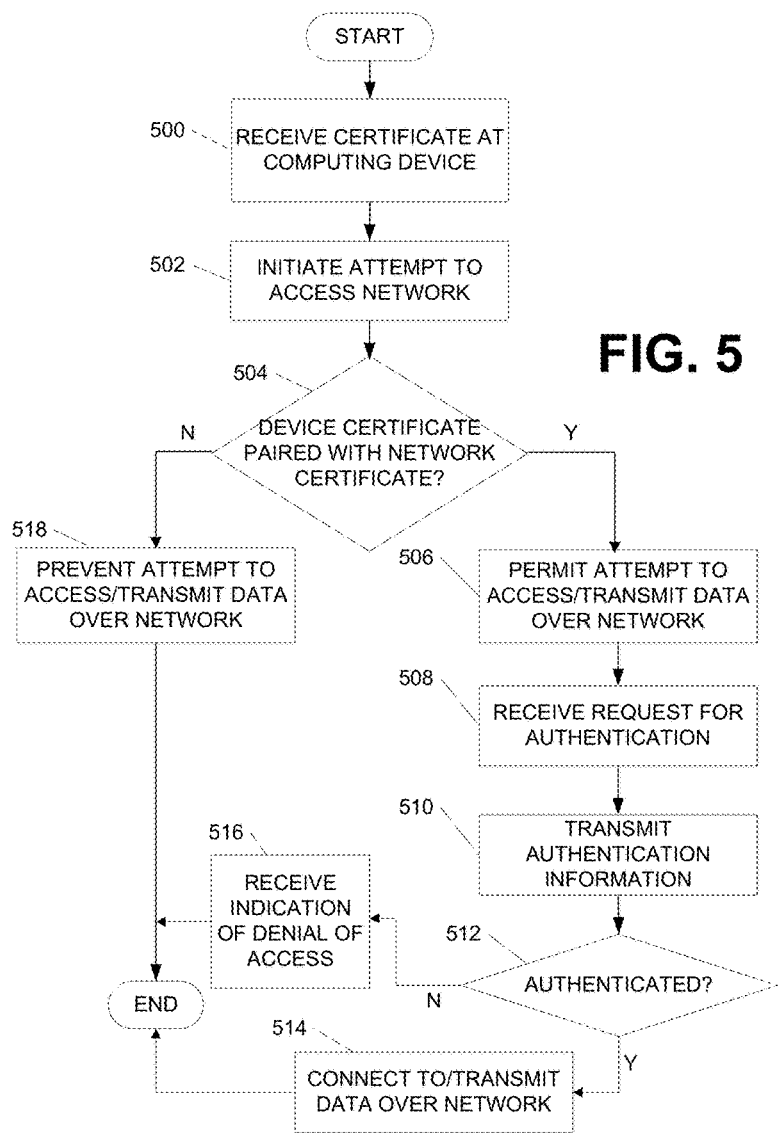
FIG. 5 is an example method of implementing the network identity certificate to ensure connection to a network associated with a trusted or expected entity according to one or more aspects described herein

FIG. 5 illustrates another example method of implementing the network identity certificate to ensure connection to a network associated with a trusted or expected entity according to one or more aspects described herein. In step 500, a certificate may be received at a computing device. As discussed above, the certificate may be a public certificate paired with a private certificate associated with a network and may be received from a trusted entity. The certificate may be provided to the computing device to ensure that the computing device connects to a network legitimately associated with an entity, such as an employer, financial institution, university, or the like.

In step 502, the computing device may initiate an attempt to access a network. The attempt to access the network may include selecting a desired or identified network from a list of available networks, as discussed above. In some examples, a connection to the selected or identified network may be made but data might not be transmitted over the network until a certificate pairing determination has been made. In step 504, a determination may be made as to whether the public certificate provided on or preinstalled on the computing device is paired with a private certificate associated with the selected or identified network. If the certificate associated with the computing device is paired with the network certificate, access to the network may be permitted in step 506 and data may be transmitted over the network.

In step 508, after the determination has been made that the certificates are paired, the computing device may display a request for authentication information. The request for authentication may be separate from and subsequent to the determination of certificate pairing. A user may enter the authentication information and, in step 510, the authentication information may be transmitted to the system for authentication. In step 512, a determination may be made as to whether the user is authenticated by the system. If so, the computing device access the network in step 514. If the user is not authenticated, an indication of denial of access to the network or failed authentication may be received at the computing device in step 516.

If, in step 504, a determination is made that the certificate associated with the computing device is not paired with the certificate associated with the network, an attempt to connect to the network may be prevented in step 518, similar to step 418.

Although the above examples describe one certificate associated with the computing device, in some arrangements, a computing device may have a plurality of certificates, each certificate being associated with a corresponding network. As discussed above, in some examples, each certificate associated with a corresponding network may be unique to the corresponding network. Thus, a user may be able to attempt to access a variety of networks with the confidence that those networks are legitimately associated with an expected or trusted entity indicated.

Figure 6A:
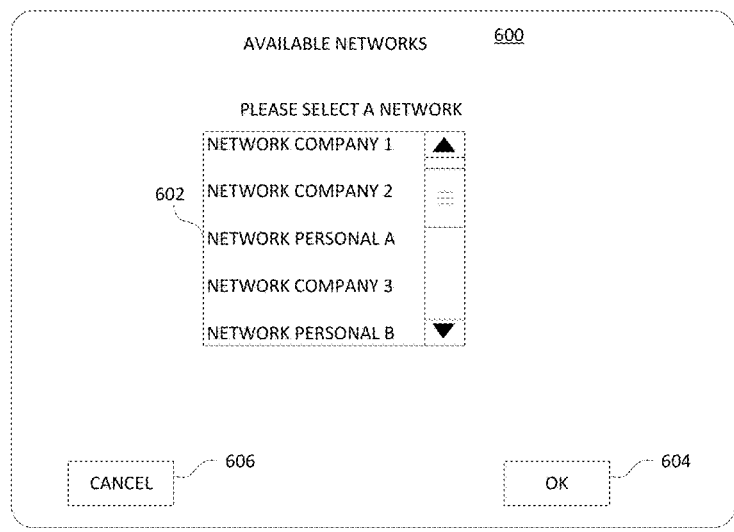
FIGS. 6A-6C illustrate example user interfaces that may be provide to a user during or after a certificate matching process according to one or more aspects described herein.
Figure 6B:
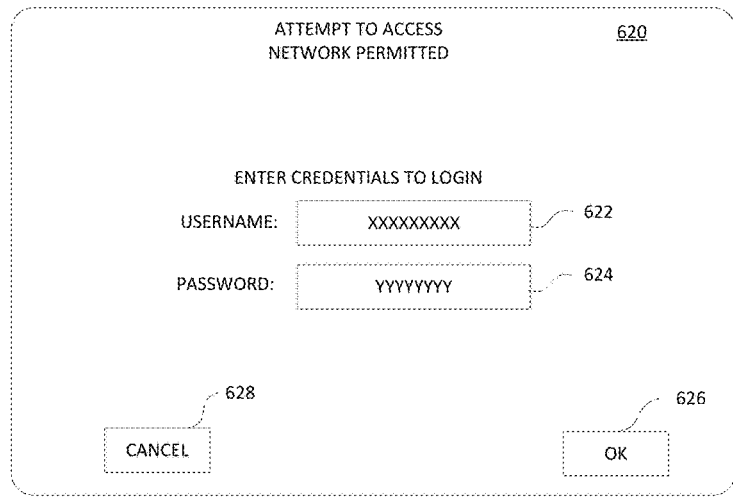
Figure 6C:
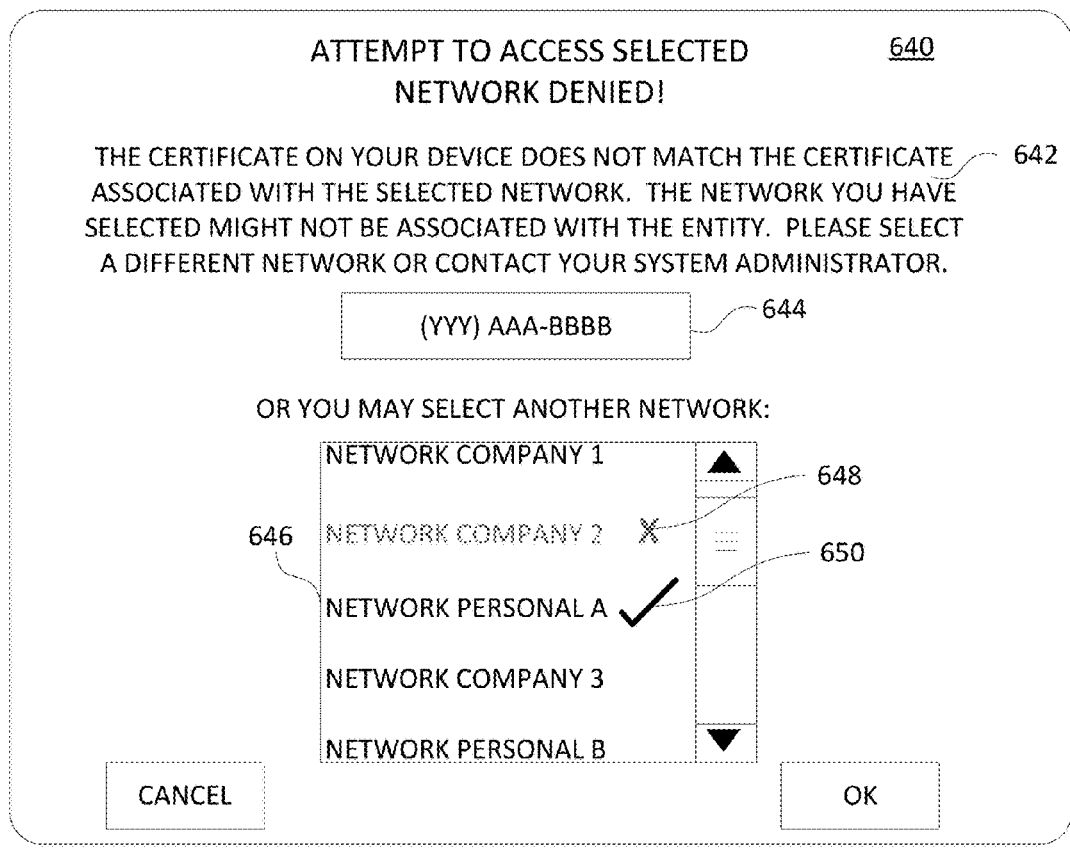

FIGS. 6A-6C illustrate various user interfaces that may be provided according to one or more aspects described herein. FIG. 6A illustrates one example user interface for selecting a network to which a computing device may attempt to connect. The user interface 600 may, in some examples, automatically be displayed to a user (e.g., upon startup, upon detection of available networks, or the like) and/or may be displayed upon receiving user input requesting display of any available networks.

The interface 600 includes a listing of available networks in field 602. The available networks may include available wireless networks and may include a name of the network. In some examples, the name of the network corresponds to an entity associated with the network, such that individuals desiring to connect to the network of the entity may easily identify the appropriate network. For instance, "Network Company 1" may be associated with an entity known as, "Company 1." However, as discussed above, malicious individuals may give a network a misleading name which may lead a user to believe a network is legitimately associated with an expected entity when, in fact, it is not. This can lead the individual accessing personal information, financial information, and the like, without the permission of the user. Accordingly, the network identity certificate arrangements described herein may be used to ensure that users are connecting to a network legitimately associated with the expected or trusted entity.

A user may select a network from the list in field 602 and may select "OK" option 604 to indicate that the user will attempt to connect to the selected or identified network. Alternatively, the user may select "CANCEL" option 606 to clear any selections made and/or return a user to a previous interface.

FIG. 6B illustrates one user interface indicating that an attempt to access the identified or selected network is permitted. As discussed above, this may be based on a determination that a public certificate provided on or preinstalled on the computing device attempting to access the network is paired with a private certificate associated with the identified or selected network. Accordingly, the user may be prompted to enter authenticating information, such a username in field 622 and password in field 624. Other types of authentication, such as biometric data, may be used without departing from the invention.

Once the authentication information has been entered, the user may select "OK" option 626 to process the information to determine whether the authenticating information matches pre-stored authenticating information (e.g., that the user is authenticated and is eligible to connect to the network). As discussed above, if the user is authenticated, access to the network may be provided. Alternatively, if the user is not authenticated, the user may receive a notification indicating that the attempt to login failed and/or that the authenticating information entered does not match pre-stored authenticating information. The user may also select "CANCEL" option 628 to clear any input and/or return to a previous interface, such as interface 600 in FIG. 6A.

FIG. 6C illustrates one example user interface 640 indicating that an attempt to access the selected or identified network is not permitted, according to one or more aspects described herein. As discussed above, if the certificate provided on or preinstalled on the computing device from which the network is selected is not paired with the certificate associated with the selected or identified network, any attempt to access the network will not be permitted. This may ensure that users do not connect to networks that may lead to potentially harmful consequences (e.g., loss of information, and the like).

The interface 640 includes region 642 in which a notification is displayed to the user indicating that the certificates are not paired and indicating that no attempts to connect to or transmit data over the selected or identified network will be permitted. The interface 640 may further include contact information (such as a phone number, email address, link to customer service page, or the like) for addressing or resolving this issue (e.g., identifying the legitimate network to which the user may connect, updating any certificates as needed, and the like). In some examples, the interface 640 may include an updated list 646 of available networks in which the previously selected network (for which the certificates did not match) may appear grayed-out or otherwise unavailable. In this example, Network Company 2 appears grayed-out or unavailable. Network Company 2 also includes a visual cue 648 (e.g., an "X") indicated that this network is not or may not be associated with a trusted entity (e.g., based on a determination that the certificate provided on the computing device is not paired with a certificate associated with that network. Various other types of visual cues may also be provided without departing from the invention, such as an unlocked padlock symbol (indicating the network is not secure, a red dot, a stop sign symbol, the color of the name of the network may appear in red, or the like.

The updated listing of available networks 646 may further include a visual cue 650 to identify networks that are deemed to be associated with a trusted entity (e.g., networks for which a determination has already been made that the certificate provided on the computing device is paired with the certificate associated with the network). For instance, visual cue 650 includes a check mark to indicate that the network is associated with the trusted entity (based on the certificate pairing). Various other types of visual cues may be used without departing from the invention, such as a locked padlock symbol (to indicate network is secure), a green dot, the color of the name of the network may appear in green, or the like.

Various examples of the implementation of the systems, apparatuses, methods and computer-readable media described herein are provided below. It should be noted that these are merely some example implementations and are not intended to limit the scope of the disclosure in any way. Rather, various other example implementations may be used without departing from the invention.

The above described arrangements aim to ensure that users are not misled into connecting to networks that are not legitimately associated with an indicated entity. For example, the arrangements described above aim to ensure that a user can confidently connect to a network having a name indicating an association with a trusted entity, with minimal concern that the network is not, in fact associated with that entity (e.g., is an illegitimate network using the name of the entity to mislead users and conduct potential unlawful or unauthorized activity). The arrangements described herein may be used with any type of network, including any wireless network (e.g., private networks, publicly available networks, cellular phone networks, and the like).

Accordingly, the arrangements described above may ensure that computing devices that are authorized to connect to a particular network (e.g., computing devices of a company that are authorized to connect to the company's network) include a certificate that is paired with a certificate associated with the network the user is authorized to access.

For example, employees of Company A may be authorized to access one or more networks including the name "CompanyA," "Company A," or the like. Certificates unique to each of the one or more networks including those names are generated and associated with each respective network. The certificates also may be transmitted to or preinstalled on one or more computing devices of one or more employees of Company A who are authorized to access the one or more networks via the one or more devices. Accordingly, when an employee of Company A attempts to access a network having the name "CompanyA," the certificate matching process will occur and an attempt to connect to the selected network (and transmission of data over the network) will only be permitted if the certificates are paired. Thus, if an individual attempting to mislead a user into connecting to a network names a network "CompanyA," the employee/user may select that network or initiate an attempt to access that network. However, if the certificate on the computing device is not paired with a certificate associated with the illegitimate "CompanyA" network, the computing device will be prevented from attempting to access the illegitimate "CompanyA" network (e.g., no data will be transmitted over the network).

In another example, the certificates may be generated for one or more networks and provided to one or more computing devices during manufacture of the devices or during software upgrades. For instance, some computing device manufacturers may desire to set up the computing devices to automatically connect to a network having a particular name anytime that network is detected by the device. In some examples, the name may be a name of a wireless service provider so that, regardless of the location of the computing device, the computing device will automatically connect to a network having the defined name anytime a network having that name is detected by the computing device.

However, malicious individuals may establish networks having the known, defined network name but that are not legitimately associated with the expected or trusted entity (e.g., the wireless service provider). Accordingly, the manufacturer may generate a certificate for the network and during manufacture or software upgrades of each computing device, may load or associate the certificate to each device. Thus, anytime a network having the predefined name is detected, the certificate pairing determination process will occur to determine whether the network is a legitimate network of the expected or trusted entity. That is, if the certificates are paired, the network may be trusted and data transmission over the network may be permitted. If the certificates are not paired, the computing device will be prevented from transmitting data over the network.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. An apparatus, comprising:
   at least one processor; and
   a memory storing computer-readable instructions that, when executed by the at least one processor, cause the apparatus to:
   generate a pair of certificates for providing secure access to a network, the pair of certificates including a first, private certificate and a second, public certificate;
   associate the first, private certificate with the network, the first, private certificate configured to indicate to a user of a computing device that the network is associated with an expected entity;
   receive, from the computing device, a request to connect to the network, the request to connect to the network including selection of the network from a list of networks available for connection;
   upon selection of the network from the list of networks available for selection, determine whether a certificate provided on the computing device is the second, public certificate paired with the first, private certificate associated with the network;
   subsequent to determining that the certificate provided on the computing device is the second, public certificate paired with the first, private certificate associated with the network, request authentication information from the user;
   determine, based on the authentication information, whether the user is authenticated; and
   responsive to determining that certificate provided on the computing device is the second, public certificate paired with the first, private certificate associated with the network and that the user is authenticated, connect the computing device to the network and transmit data over the network; and
   responsive to determining that the certificate provided on the computing device is not the second, public certificate paired with the first, private certificate associated with the network, prevent the computing device from connecting to the network and transmitting data over the network.

2. The apparatus of claim 1, wherein the generating the pair of certificates is performed prior to associating the first, private certificate with the network.

3. The apparatus of claim 2, further including instructions that, when executed, cause the apparatus to:
   identify a plurality of computing devices authorized to access the network; and
   provide the generated second, public certificate to the plurality of computing devices, wherein the computing device is one computing device of the plurality of computing devices.

4. The apparatus of claim 1, further including instructions that, when executed, cause the apparatus to:
   display a list of networks available for attempted connection by the user via the computing device, the list of networks available including the network.

5. The apparatus of claim 1, wherein the determining whether a certificate provided on the computing device is the second, public certificate paired with the first, private certificate associated with the network is performed prior to transmitting data over the network.

6. The apparatus of claim 1, wherein the first, private certificate is unique to the network.

7. The apparatus of claim 1, wherein the computing device includes a plurality of certificates unique to corresponding networks of a plurality of networks.

8. The apparatus of claim 1, wherein the expected entity is an entity associated with a name of the network.

9. A method, comprising:
   generating, by a network identity certificate system having at least one computing device including at least one processor, a pair of certificates for providing secure access to a network, the pair of certificates including a first, private certificate and a second, public certificate;
   associating, by the network identity certificate system the first, private certificate with the network, the first, private certificate configured to indicate to a user of a computing device that the network is associated with an expected entity;
   receiving, by the network identity certificate system and from the computing device, a request to connect to the network, the request to connect to the network including selection of the network from a list of networks available for connection;
   upon selection of the network from the list of networks available for selection, determining, by the network identity certificate system, whether a certificate provided on the computing device is the second, public certificate paired with the first, private certificate associated with the network;

subsequent to determining that the certificate provided on the computing device is the second, public certificate paired with the first, private certificate associated with the network, request authentication information from the user;

determining, based on the authentication information, whether the user is authenticated; and responsive to determining that certificate provided on the computing device is the second, public certificate paired with the first, private certificate associated with the network and that the user is authenticated, connecting the computing device to the network and transmitting data over the network; and responsive to determining that the certificate provided on the computing device is not the second, public certificate paired with the first, private certificate associated with the network, preventing the computing device from connecting to the network and transmitting data over the network.

10. The method of claim 9, wherein the generating the pair of certificates is performed
prior to associating the first, private certificate with the network.

11. The method of claim 10, further including:
identifying, by the network access certificate system, a plurality of computing devices authorized to access the network; and
providing the generated second, public certificate to the plurality of computing devices, wherein the computing device is one computing device of the plurality of computing devices.

12. The method of claim 9, further including:
displaying, by the computing device, a list of networks available for attempted connection by the user, the list of networks available including the network.

13. The method of claim 9, wherein the determining whether a certificate provided on the computing device is the second, public certificate paired with the first private certificate associated with the network is performed prior to attempting to transmit data over the network.

14. The method of claim 9, wherein the first, private certificate is unique to the network.

15. The method of claim 9, wherein the computing device includes a plurality of certificates unique to corresponding networks of a plurality of networks.

16. The method of claim 9, wherein the expected entity is an entity associated with a name of the network.

17. One or more non-transitory computer-readable media having computer-executable instructions stored thereon that, when executed, cause at least one computing device to:
generate a pair of certificates for providing secure access to a network, the pair of certificates including a first, private certificate and a second, public certificate;
associate the first, private certificate with the network, the first private certificate configured to indicate to a user of a computing device that the network is associated with an expected entity;
receive, from the computing device, a request to connect to the network, the request to connect to the network including selection of the network from a list of networks available for connection;
upon selection of the network from the list of networks available for selection, determine whether a certificate provided on the computing device is the second, public certificate paired with the first, private certificate associated with the network;
subsequent to determining that the certificate provided on the computing device is the second, public certificate paired with the first, private certificate associated with the network, request authentication information from the user;
determine, based on the authentication information, whether the user is authenticated; and
responsive to determining that certificate provided on the computing device is the second, public certificate paired with the first, private certificate associated with the network and that the user is authenticated, connect the computing device to the network and transmit data over the network; and
responsive to determining that the certificate provided on the computing device is not the second, public certificate paired with the first, private certificate associated with the network, prevent the computing device from connecting to the network and transmitting data over the network.

* * * * *